United States Patent
Rutkiewicz et al.

(10) Patent No.: US 10,096,256 B2
(45) Date of Patent: Oct. 9, 2018

(54) METHOD AND SYSTEM FOR AIRCRAFT TAXI STRIKE ALERTING

(71) Applicant: Rosemount Aerospace Inc., Burnsville, MN (US)

(72) Inventors: Robert Rutkiewicz, Edina, MN (US); Todd Anthony Ell, Savage, MN (US); Joseph T. Pesik, Eagan, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 85 days.

(21) Appl. No.: 15/451,969

(22) Filed: Mar. 7, 2017

(65) Prior Publication Data
US 2018/0261111 A1  Sep. 13, 2018

(51) Int. Cl.
*H04N 7/18* (2006.01)
*H04N 5/225* (2006.01)
(Continued)

(52) U.S. Cl.
CPC ............ *G08G 5/065* (2013.01); *B64D 47/08* (2013.01); *G08G 5/04* (2013.01); *H04N 5/2256* (2013.01); *H04N 5/33* (2013.01); *H04N 7/183* (2013.01)

(58) Field of Classification Search
CPC ........ H04N 5/2256; H04N 5/33; H04N 7/183; H04N 7/185; H04N 7/188; H04N 5/225;
(Continued)

(56) References Cited

U.S. PATENT DOCUMENTS

| 6,405,975 B1 | 6/2002 | Sankrithi et al. |
| 6,571,166 B1 | 5/2003 | Johnson et al. |

(Continued)

FOREIGN PATENT DOCUMENTS

| CA | 2464791 A1 | 10/2004 |
| CA | 2737189 A1 | 10/2011 |

(Continued)

OTHER PUBLICATIONS

International Civil Aviation Organization, "AERODROME STANDARDS: Aerodrome Design and Operations", ICAO: Cooperative Development of Operational Safety and Continuing Airworthiness, dated Jul. 1999, 194 pages.

(Continued)

*Primary Examiner* — Sherrie Hsia
(74) *Attorney, Agent, or Firm* — Kinney & Lange, P.A.

(57) ABSTRACT

Apparatus and associated methods relate to calculating position and/or range data of object(s) in a scene external to an aircraft. A light projector is configured to project, from an aircraft projector location, a collimated beam of light in a controllable direction onto the scene. The light projector is further configured to control the intensity of the projected light, based on the controlled direction of the collimated beam of light. The reflected beam is detected by a camera located apart from the light projector. An image processor is configured to use triangulation, to calculate position values and/or range data of the object(s) in the scene. The image processor can be further configured to identify the object(s) in the scene and to produce, based in object(s) in the scene, one or more maps of the scene. The intensity of the collimated beam can be controlled based on the produced maps.

20 Claims, 8 Drawing Sheets

(51) Int. Cl.
*G08G 5/06* (2006.01)
*H04N 5/33* (2006.01)
*B64D 47/08* (2006.01)
*G08G 5/04* (2006.01)

(58) Field of Classification Search
CPC . H04N 7/18; G08G 5/065; G08G 5/04; B64D 47/08
USPC ......... 348/143, 144, 169; 382/103; 340/945, 340/963; 701/301
See application file for complete search history.

(56) References Cited

U.S. PATENT DOCUMENTS

| | | |
|---|---|---|
| 6,754,370 B1 | 6/2004 | Hall-Holt et al. |
| 7,495,600 B2 | 2/2009 | Rees et al. |
| 7,592,929 B2 | 9/2009 | Pepitone |
| 7,974,773 B1 | 7/2011 | Krenz et al. |
| 7,983,802 B2 | 7/2011 | Breed |
| 8,487,787 B2 | 7/2013 | Best et al. |
| 9,047,771 B1 | 6/2015 | Thoreen et al. |
| 9,174,746 B1 | 11/2015 | Bell et al. |
| 9,245,450 B1 | 1/2016 | Chiew et al. |
| 9,335,405 B2 | 5/2016 | Durand et al. |
| 9,401,094 B2 | 7/2016 | Cros et al. |
| 9,483,952 B2 | 11/2016 | Chew |
| 2003/0043058 A1 | 3/2003 | Jamieson et al. |
| 2005/0007257 A1 | 1/2005 | Rast et al. |
| 2007/0241936 A1 | 10/2007 | Arthur et al. |
| 2010/0094487 A1 | 4/2010 | Brinkman |
| 2014/0092206 A1 | 4/2014 | Boucourt et al. |
| 2015/0142214 A1 | 5/2015 | Cox et al. |
| 2015/0262492 A1 | 9/2015 | Barnes et al. |
| 2016/0171898 A1 | 6/2016 | Silver |
| 2016/0266256 A1 | 9/2016 | Allen et al. |
| 2017/0301250 A1 | 10/2017 | Ell et al. |
| 2017/0334578 A1 | 11/2017 | Fleck et al. |

FOREIGN PATENT DOCUMENTS

| | | |
|---|---|---|
| CN | 105391975 A | 3/2016 |
| EP | 0980828 A1 | 2/2000 |
| EP | 1842772 A2 | 10/2007 |
| EP | 1927965 A2 | 6/2008 |
| EP | 2426461 A2 | 3/2012 |
| EP | 2495168 A1 | 9/2012 |
| EP | 2565861 A2 | 3/2013 |
| EP | 2685442 A2 | 1/2014 |
| EP | 2824474 A1 | 1/2015 |
| EP | 3235735 A1 | 10/2017 |
| WO | 2009010969 A2 | 1/2009 |
| WO | 2015157410 A1 | 10/2015 |

OTHER PUBLICATIONS

International Civil Aviation Organization, "Airport Markings: ICAO & U.S. Requirements", ICAO: Federal Aviation Administration, dated Jun. 2012, 19 pages.
U.S. Department of Transporation, "Advisory Circular", U.S. DOT: Federal Aviation Administration, dated Sep. 27, 2013, 144 pages.
Ku, Lun Hui et al., "A New Lane Department Warning Algorithm Considering the Driver's Behavior Characteristics", Hindawi Publishing Corporation: Mathematical Problems in Engineering, dated Jul. 26, 2015, 12 pages.
Federal Aviation Administration, "A Quick Reference to Airfield Standards", FAA: Southern Region Airports Division, dated Jan. 2018, 69 pages.
Extended European Search Report, for European Patent Application No. 18158847.6, dated May 14, 2018, 12 pages.

Fig. 7A

METHOD AND SYSTEM FOR AIRCRAFT TAXI STRIKE ALERTING

BACKGROUND

Each year, significant time and money are lost due to commercial aircraft accidents and incidents during ground operations, of which significant portions occur during taxiing maneuvers. During ground operations, aircraft share the taxiways with other aircraft, fuel vehicles, baggage carrying trains, mobile stairways and many other objects. Aircrafts often taxi to and/or from fixed buildings and other fixed objects. Should an aircraft collide with any of these objects, the aircraft must be repaired and recertified as capable of operation. The cost of repair and recertification, as well as the lost opportunity costs associated with the aircraft being unavailable for use can be very expensive.

Pilots are located in a central cockpit where they are well positioned to observe objects that are directly in front of the cabin of the aircraft. Wings extend laterally from the cabin in both directions. Some commercial and some military aircraft have large wingspans, and so the wings on these aircraft laterally extend a great distance from the cabin and are thus positioned behind and out of the field of view of the cabin. Some commercial and some military planes have engines that hang below the wings of the aircraft. Pilots, positioned in the cabin, can have difficulty knowing the risk of collisions between the wingtips and/or engines and other objects external to the aircraft. An aircraft on-ground collision alerting system would be useful to survey the area forward or aft of the tail, wingtips and/or engines, to detect obstructions in a potential collision path, and to provide visual and audible alerts to the cockpit.

SUMMARY

Apparatus and associated methods relate to a system for calculating position values and/or range data of object(s) in a scene external to an aircraft. The system includes a light projector mounted at a projector location on the aircraft. The light projector is configured to project a collimated beam of light in a controllable direction onto the scene external to the aircraft. The light projector is further configured to control the intensity of the projected light, based on the controlled direction of the collimated beam of light. The system includes a camera mounted at a camera location on the aircraft. The camera is configured to receive a portion of the collimated beam reflected by the scene. The camera is further configured to focus the received portion onto a focal plane array comprising a plurality of light-sensitive pixels, thereby forming an image of the scene. The image includes pixel data generated by the plurality of light-sensitive pixels. The system also includes an image processor configured to identify pixel coordinates corresponding to a subset of the plurality of light-sensitive pixels upon which the received portion of the collimated beam reflected by the scene is focused. The image processor is further configured to use triangulation, based on the projector location, the camera location, and the identified pixel coordinates, to calculate position values and/or range data of object(s) in the scene by which the collimated beam of light is reflected.

Some embodiments relate to a method for generating an alert signal of a potential aircraft collision. The method includes projecting a beam of collimated light in a controllable direction onto a scene. The method includes controlling the intensity of the projected light, based on the controlled direction of the collimated beam of light. The method includes receiving a portion of the collimated beam reflected by the scene. The method includes focusing the received portion onto a focal plane array comprising a plurality of light-sensitive pixels, thereby forming an image of the scene, the image comprising pixel data generated by the plurality of light-sensitive pixels. The method includes identifying pixel coordinates corresponding to a subset of the plurality of light-sensitive pixels upon which the received portion of the collimated beam reflected by the scene is focused. The method includes calculating, based on the projector location, the controlled direction of the collimated beam, the camera location, and the identified pixel coordinates, position values and/or range data of object(s) in the scene by which the collimated beam of light is reflected. The method also includes generating an alert signal if the calculated position values and range data of object(s) indicate that object(s) are within a collision zone or on a collision trajectory.

BRIEF DESCRIPTION OF THE DRAWINGS

FIG. 7A is a diagram depicting a portion of a data map of projector light intensity of illumination duration.

DETAILED DESCRIPTION

Figure 1:
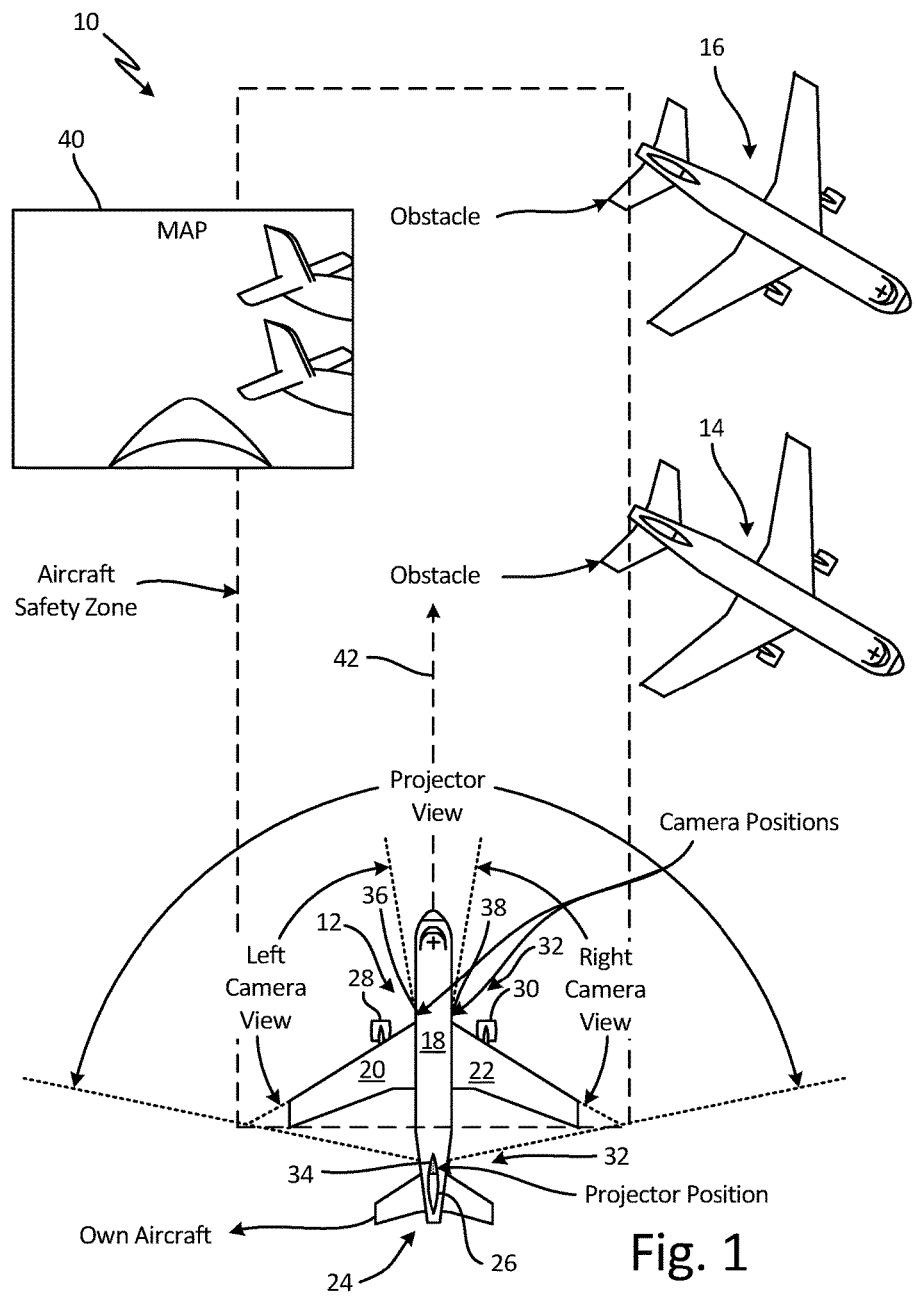
FIG. 1 is a schematic view of an exemplary aircraft collision alerting system used by an aircraft during on-ground operations.

Apparatus and associated methods relate to ranging an object nearby an aircraft using triangulation of a directed beam of light projected upon and reflected by the nearby object. The spatially patterned light can have a wavelength corresponding to infrared light and/or to an atmospheric absorption band. Using infrared light, being outside the visible spectrum, can minimize a distraction to a pilot who is taxiing the aircraft. Using infrared light that has a wavelength within an atmospheric absorption band can permit low-power projector illumination, as the illuminating power need not compete with the sun's illumination in such an absorption band. Knowing a first aircraft location from where the light is projected, a second aircraft location where the reflection is imaged, and a location within the image corresponding to a feature of the spatially patterned light permits a calculation of the location and/or range of the illuminated object.

Various objects in the scene can have various indices of optical absorption, reflection, and/or transmission. Thus reflected optical signals can vary in intensity due to the optical indices of absorption, reflection and/or transmission. Objects with large indices of reflection, for example, can produce a reflected signal of high intensity, whereas objects with low indices of reflection might produce a reflected signal of low intensity. The reflected intensity of the optical signal is not used in the triangulation computation of the object's location and/or range, but the reflected intensity must be sufficiently high so as to be imaged by the camera. To reliably image a reflection from low-reflectivity objects, a high-intensity collimated beam might be required, whereas for high-reflectivity objects, a low-intensity collimated beam might be sufficient. Thus, power can be conserved by modulating the intensity of the optical beam, based on parameters such as reflectivity of the objects in the scene. Thus, the objects in the scene can be identified in the captured images and mapped so as to provide object data for determining desired intensity levels. Various other system parameters can be controlled for various other purposes based on maps of objects in the scene as will be disclosed below.

In some embodiments, images of the object are captured both with and without illumination by the spatially-patterned light. A difference between these two images can be used to help isolate the reflections of the spatially-patterned light. The two images can also be used in tandem to identify pixel boundaries of the object and to calculate range values of portions of the object corresponding to pixels imaging these portions. For pixels imaging reflections of the spatially-patterned light, triangulation can be used to calculate range. For pixels not imaging reflections of the spatially-patterned light, range can be calculated using one or more calculated ranges corresponding to nearby pixels imaging the directed beam of light reflected from the object. Using these two ranging techniques provides pixel level resolution of location values, while requiring only sparse illumination of objects by spatially-patterned light.

FIG. 1 is a schematic view of an exemplary aircraft collision alerting system used by a taxiing aircraft. In FIG. 1, aircraft taxi scenario 10 includes taxiing aircraft 12 and two parked aircraft 14, 16. Taxiing aircraft 12 has cabin 18, left wing 20, right wing 22 and tail 24. Tail 24 has vertical stabilizer 26. Left engine 28 hangs from left wing 20, and right engine 30 hangs from right wing 22. Taxiing aircraft 12 is equipped with one embodiment of aircraft collision alerting system 32. Aircraft collision alerting system 32 includes light projector 34, left-side camera 36, and right-side camera 38. In the depicted embodiment, light projector 34 is mounted on vertical stabilizer 26 of tail 24. Light projector 34 is configured to project a collimated beam of light onto a scene external to taxiing aircraft 12, thereby illuminating objects nearby and external to taxiing aircraft 12. Light projector 34 can be mounted at other locations on taxiing aircraft 12 in other embodiments. Aircraft collision alerting system 32 also uses map 40 of the scene to provide data to a system controller. The system controller is configured to control and/or coordinate various aspects of collision alerting system 32. Map 40 can be produced by an image processor, based on images captured by left-side camera 36 and right-side camera 38.

Light projector 34 projects a collimated beam of light and controllably directs the collimated beam over a solid angle of illumination. The collimated beam of light illuminates various objects that reside within the solid angle of illumination. In the depicted embodiment, light projector 34 has an optical axis that is coplanar with cabin axis 42 of taxiing aircraft 12. Light projector 34 is configured to control a direction of the collimated beam about the optical axis. Light projector 34 is shown illuminating objects that are within an azimuthal range of +/−85 degrees, for example, of cabin axis 42 of taxiing aircraft 12, and within an elevation range of a projection horizon of light projector 34. The elevation range of projection, for example, can be from about +3, +5, +10, +12, or +15 degrees to about −2, −5, −8, or −10 degrees of projection from a vertical location of light projector 34, sufficient to encompass the wingtips of left wing 20 and right wing 22, as well as a plane extending forward of these wingtips parallel to cabin axis 42.

In some embodiments, the collimated beam of light can continuously illuminate objects within the solid angle of illumination. In other embodiments, the collimated beam of light can intermittently illuminate objects within the solid angle of illumination. Such illumination may use light of various wavelengths. For example, in some embodiments, infrared light, being invisible to a human eye, can be used to provide illumination of objects within the solid angle of illumination. Infrared light can advantageously be non-distractive to pilots and to other people upon whom the collimated beam of light is projected.

In some embodiments, the directed beam of light is pulsed on for a limited time, with image capture synchronized with the projector illumination. Shorter image capture durations reduce the light captured from solar illumination, lowering the needed projector power. In some embodiments, light projector 34 is controlled so as to facilitate imaging of various objects within the scene by left-side camera 36 and right-side camera 38. Light projector 34 can be controlled based on the object toward which the collimated beam is directed. Various parameters of the collimated beam produced by light projector 34 can be controlled. For example, the direction of the beam can be controlled so as to scan a particular object in the scene. The instantaneous intensity of the collimated beam can be modulated, based on a parameter of the object toward which the beam is directed. The system controller can also coordinate the shuttering of images by left-side camera 36, right-side camera 38 with the collimated beam produced by light projector 34.

Various maps can be managed by the system controller so as to provide various kinds of data to be used to control the system parameters of aircraft collision alerting system 32. For example, a map of the airport elements can be used to provide location data related to fixed and moveable airport elements. An aircraft feature map can provide data related to fixed and moveable aircraft features. A moving object map can provide data related to moving objects external to the aircraft, such as baggage carriers, fuel vehicles, etc. A reflectivity map can be maintained so as to provide data related to a measured reflectivity of various objects within the scene. Many variables may impact the reflectivity values of obstacles including angle of incidence, range, size of obstacle, atmospheric attenuation, etc. Other maps can also be maintained to provide other types of data for used by the system controller, as will be disclosed below.

In some embodiments, intensity of the directed beam of light can be controlled based on ground speed of aircraft. Faster moving aircraft may control the directed beam of light to have a greater intensity. Also, the intensity can be controlled such that objects at greater ranges are illuminated at a greater intensity than objects at a closer range. In some embodiments, the intensity of the directed beam of light may be controlled based on atmospheric conditions (e.g., atmospheric attenuation). In an exemplary embodiment, power intensity of the directed beam can be varied while looking at a known location(s) on host aircraft 12. A magnitude of the signal reflected from the known location(s) on host aircraft 12 can be compared to a predetermined reference signal level at a standard attenuation to determine instantaneous attenuation of atmospheric conditions. Such a method can be used to normalize the measured reflected power intensity for various atmospheric conditions. In some embodiments, light having wavelengths within an atmospheric absorption band can be used. Careful selection of projector wavelength can permit light projector 34 to compete favorably with solar energy. There are, however, certain wavelengths where the atmospheric absorption is so great that both projector energy and solar energy are attenuated equally. Light is broadband as emitted from the sun with a maximum intensity falling in the visible light spectrum. Sunlight having wavelengths within the infrared spectrum is of lower intensity than the visible band. And so, projected light having such wavelengths need not compete with the sunlight. Using light having such wavelengths can thereby permit reduced power levels in projecting collimated beam of lights. Atmospheric absorption bands may further reduce solar infrared illumination. For example, atmospheric absorption bands include infrared wavelengths of between about 1.35-1.4, 1.8-1.95, 2.5-2.9, and 5.5-7.2 microns.

The collimated beam of light that is projected by light projector 34 can be scanned in a predetermined pattern so as to have a structure that can be identified in images formed by cameras 36, 38. Using knowledge of the location from which the feature is projected (e.g., the location of image projector 34), the location of the cameras 36, 38 and the location within the images (e.g., pixel coordinates) where the feature is imaged can permit location determination using triangulation of the object reflecting the collimated beam. For example, light projector 34 can be located at an elevation on taxiing aircraft 12 that is higher than an elevation where cameras 36, 38 are located. A location of the imaged feature can be used to determine a location and a range distance to the object from which that specific feature is reflected.

Light projector 34, for example, can emit a structured beam of light to produce a pattern that, when reflected from a surface having a normal direction to cabin axis 42 is imaged as horizontal lines by cameras 36 and 38. One structured beam, for example, might be projected at an angle of elevation of zero degrees (i.e., directed parallel to the horizon). A second structured beam might be projected at an angle of negative five degrees from the horizon (i.e., directed at a slightly downward angle from light projector 34). Each of these projected structured beams of light, when reflected from an object, will be imaged at a different vertical location (e.g., each will have a different vertical pixel coordinate) within the camera image, depending on the range distance between the reflecting object and taxiing aircraft 12. Knowing the elevation of light projector 34, the elevations of cameras 36, 38, the specific feature of the collimated beam of light (e.g., which horizontal line is imaged), and the location within the camera image where the specific feature is imaged can permit a determination of the location of the object from which the specific feature has been reflected.

Using the calculated location information, pilots of taxiing aircraft 12 can be informed of any potential collision hazards within the scene illuminated by light projector 34. Pilots of taxiing aircraft 12 can steer aircraft 12 to avoid wingtip collisions and/or engine collisions based on the location and range information that is calculated by aircraft collision alerting system 32.

Figure 2:
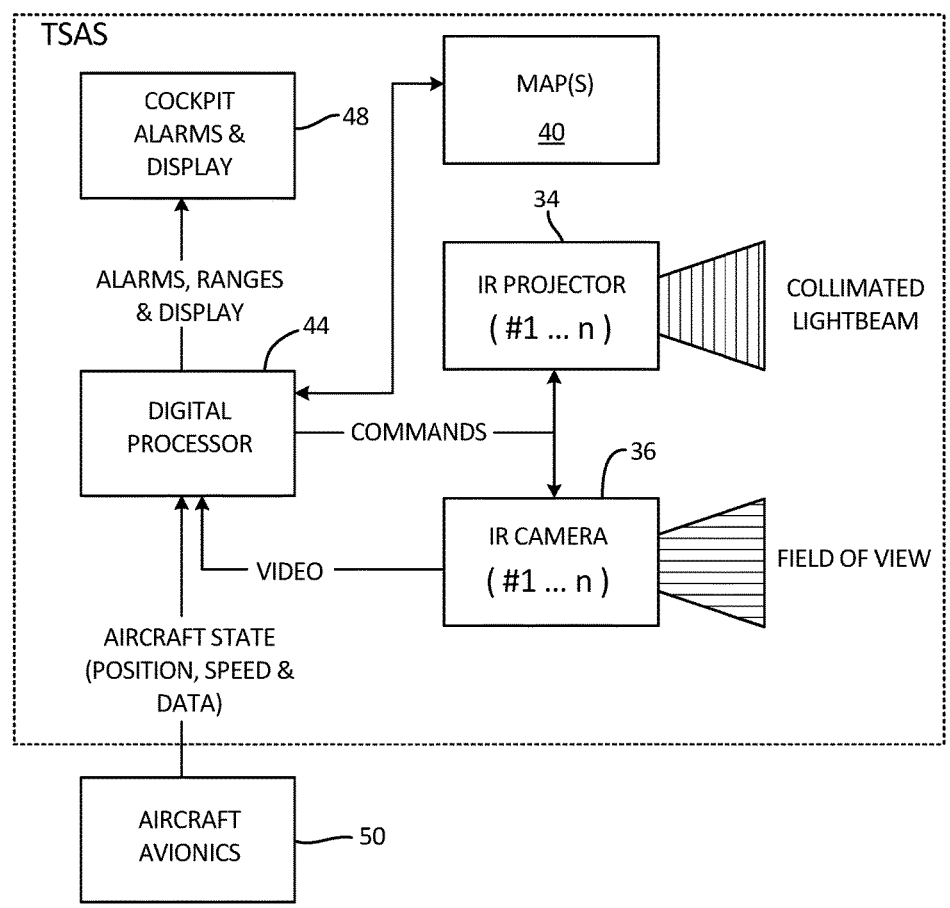
FIG. 2 is a block diagram of an exemplary aircraft collision alerting system.

FIG. 2 is a block diagram of an exemplary aircraft collision alerting system. Aircraft collision alerting system 32 includes infrared light projector(s) 34, camera(s) 36, image processor 44, one or more map(s) 40 applicable to the scene, and cockpit alarm and display module 48. Infrared light projector(s) 34 is configured to be mounted at a projector location on an aircraft. Infrared light projector(s) 34 is further configured to project and to direct a collimated beam of light from infrared light projector(s) 34 onto a scene external to the aircraft, thereby illuminating objects within the scene.

Camera(s) 36 is configured to be mounted at one or more camera locations on the aircraft. Camera(s) 36 is further configured to receive light reflected by the objects within the scene. Camera(s) 36 is further configured to focus the received light onto a focal plane array comprising a plurality of light-sensitive pixels, thereby forming an image of the scene. The image can include pixel data generated by the plurality of light-sensitive pixels. Digital processor 44 can be configured to identify pixel coordinates corresponding to a subset of the plurality of light-sensitive pixels upon which the received portion of the collimated beam reflected by the scene is focused. The image processor can be further configured to use triangulation, based on the projector location, the controlled direction of the collimated beam, the camera location, and the identified pixel coordinates, to calculate position and/or range data of object(s) in the scene by which the collimated beam of light is reflected. Digital processor 44 can then identify, based on the calculated position and/or range data, various attributes of object(s) reflecting the collimated beam. For example, digital processor 44 can identify if the object is part of the aircraft, or if the object is not part of the aircraft. Digital processor 44 can identify a reflectivity of the reflecting object based on a ratio of intensities of the emitted collimated beam and the received portion reflected by the object. Digital processor 44, can identify, based on a sequence of images, a velocity of the reflecting objects relative to the aircraft.

Digital processor 44 receives inputs from camera(s) 36 and from aircraft avionics 50. Digital processor 44 generates commands that control the operation of infrared light projector(s) 34 and camera(s) 36. Digital processor 44 outputs alarms, positions and/or ranges of objects in the scene, and images to cockpit alarms and display module 48. Digital processor 44 is configured to identify pixel coordinates corresponding to a subset of the plurality of light-sensitive pixels upon which the directed beam of light projected by infrared light projector(s) 34 and reflected from the spatially-patterned portion of the scene is focused. Digital processor 44 is further configured to use triangulation, based on the projector location of infrared light projector(s) 34, the location(s) of camera(s) 36 and the identified pixel coordinates, to calculate range value data of object(s) in the scene from which the directed beam of light projected by infrared light projector(s) 34 is reflected.

Infrared light projector(s) 34 can use various means for directing the collimated beam within the solid angle of illumination. For example, the optical beam can be directed via opto-mechanical means. In some embodiments, infrared light projector(s) 34 may employ a digital light processor chip, a scanning LIDAR sensor, a galvanometer mirror, and/or a resonant mirror, for example. In some embodiments, a fixed light emitting array may control beam direction by controlling individual array elements.

Figure 3:
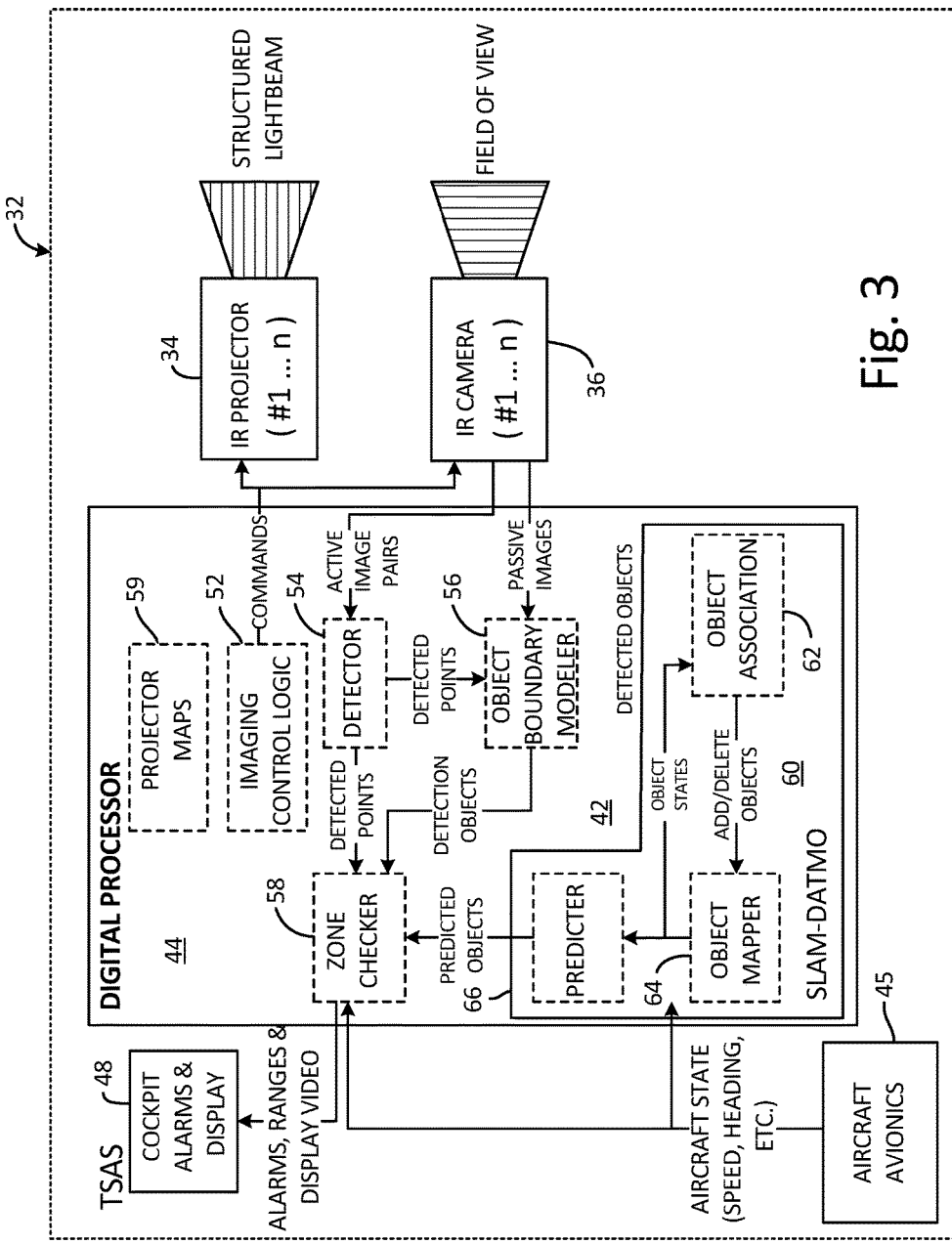
FIG. 3 is a detailed block diagram of the exemplary aircraft collision alerting system depicted in FIG. 2.

FIG. 3 is a detailed block diagram of the exemplary aircraft collision alerting system depicted in FIG. 2. Aircraft collision alerting system 32 includes infrared light projector(s) 34, camera(s) 36, image processor 44, and cockpit alarm and display module 48. Infrared light projector(s) 34 is configured to be mounted at a projector location on an aircraft. Infrared light projector(s) 34 is further configured to project directed beam of light from infrared light projector(s) 34 onto a scene external to the aircraft, thereby illuminating a spatially-patterned portion of the scene. Image processor 44 is shown in greater detail than shown in FIG. 2.

Image processor 44 includes imaging control logic 52, detector 54, object boundary modeler 56, zone checker 58, projector maps generator module 59, and Simultaneous Localization And Mapping (SLAM) and Detection And Tracking of Moving Objects (DATMO) module 60. Image control logic 52 can generate commands that control operation of infrared light projector(s) 34 and camera(s) 36. For example, image control logic 46 can control an intensity and/or direction of the collimated beam emitted by infrared light projector(s) 34. Imaging control logic 46 can control a timing of when infrared light projector(s) 34 generates a collimated beam of light and projects the collimated beam of light upon a scene external to the aircraft. Imaging control logic 46 can control a timing of when camera(s) 36 generates images of the scene. Such timing coordination can be used to ensure that images generated by camera(s) 36 contain and/or exclude collimated beams of light projected from infrared light projector(s) 34, for example.

Projector map module 59 generates a set of maps that image control logic 52 can use to command IR projector 34. Projector map module 59 can be configured to receive data from various sources, such as, for example, from images, aircraft avionics, detected objects, and previously stored data of airport structures. Projector map module 59 can be configured to generate, based on the received data, one or more maps to be used for determining an intensity level of illumination by infrared light projector(s) 34.

Detector 54 is configured to receive the images generated by camera(s) 36. Detector 54 is further configured to identify locations within the received images that include light of the projected collimated beam of light reflected from an object in the scene. Detector 54 is further configured to identify the specific features of the collimated beam of light corresponding to the identified locations. For example, detector 54 may identify a first subset of the plurality of pixels of the image as being associated with a first horizontal line, and a second subset of the plurality of pixels with a second horizontal line.

Detector 54 can use image pairs in identifying locations within the received images that include light of the projected collimated beam of light reflected from an object in the scene. For example, a first image of the received image pair can be generated by camera(s) 36 at a time when infrared light projector(s) 34 is not illuminating the scene. A second image of the received image pair can be generated by camera(s) 36 at a time when infrared light projector(s) 34 is illuminating the scene. These second images of the received image pairs thereby contain light projected by infrared light projector(s) 34 and reflected from the objects in the scene. Conversely, the first images of the received image pairs do not contain light projected by infrared light projector(s) 34 and reflected from the objects in the scene, but only light reflected from the objects that is projected thereon from other sources. Detector 54 can generate a difference image based on a difference between the first and second images of each image pair. This technique can reduce the pixel response of light reflected from the objects that is projected thereon from these other sources. In some embodiments, negative values generated by taking the difference between the first and second images of these image pairs are set to zero.

Various methods for identifying the features imaged by camera(s) 36 can be used. In some embodiments, each feature is encoded by modulating the intensity of that feature in the time domain and/or in the spatial domain. For example, each horizontal line can be encoded in the time domain using amplitude modulation. In some embodiments, each horizontal line can be encoded differently in the spatial domain as different dashed patterns, for example. In some embodiments each feature may be illuminated at a different time. Multiple images can be generated by the camera, so as to sequentially capture each of the separately timed features. In some embodiments, different frequencies of light can be used for different features.

Object boundary modeler 56 receives the collimated beam of light locations identified by detector 54. Object boundary modeler 56 also receives the passive images (e.g., those images that do not contain light projected by infrared light projector(s) 34 from camera(s) 36. Object boundary modeler 56 determines pixel boundaries of various objects imaged in passive images received by camera(s) 36. Object boundary modeler 56 may use local groupings of the received collimated beam of light and the corresponding calculated position and/or range to identify separate structures or to identify a continuum of a single structure. For example, local groupings of identified collimated beam of light locations that have similar corresponding locations might be associated with a common object. The passive image can be processed using various boundary and/or edge detection algorithms to identify potential object boundaries. Local groupings having similar corresponding calculated ranges can be used to annotate objects with identified boundary edges. The passive images with identified boundary edges can be used to show the spatial extent of the ranged objects. Object boundary modeler can be used to interpolate the range of every pixel within the identified boundary edges using the nearby members of the grouping of calculated ranges.

Zone checker 58 receives the identified boundaries of ranged objects from object boundary modeler 56. Zone checker 58 then compares the location and range of such objects with the taxi path of taxiing airplane 12 and determines a collision risk score. If, for example, the collision risk score exceeds a predetermined value, then zone checker 58 may generate an alert signal and output it to cockpit alarms and display module 48. Zone checker 58 may also output passive images annotated with range values corresponding to detected objects for visual display on a display screen of cockpit alarms and display module 48.

Zone checker 58 can use a zone or multiple zones in determining a risk score. A zone, for example, can be a keep-out box surrounding the aircraft or some portion of the aircraft. Any object detected to be within the keep-out zone can cause zone checker 58 to generate an alert signal. In some embodiments, a series of zones around key aircraft components may be used, such as, for example, around wing-tips and/or engines. These zones can extend above and/or below the occupied region of these aircraft components to include a safety margin in elevation. These zones can also extend forward/aft or inboard/outboard of the aircraft components to provide safety margin in the direction of a plane trajectory. A volume of an audible alert signal can be adapted to the closing speed and/or range of the objects which are on a collision course with taxiing aircraft 12. For example, a risk score may be increased for an object in a forward zone as the speed of taxiing aircraft 12 increases. In some embodiments, a lateral danger zone for objects located laterally from the wingtips of taxiing aircraft 12 can be reduced as taxiing aircraft 12 slows down to permit the pilot to crawl past objects in tight quarters.

SLAM-DATMO module 60 is configured to track the detected and ranged objects. SLAM-DATMO module 60 receives the object boundaries detected by object boundary modeler 56 and receives the location values of such objects as inputs. In some embodiments, SLAM-DATMO module 60 also receives the passive images generated by camera(s) 36. SLAM-DATMO module 60 includes object association module 62, object mapping module 64, and predictor module 66. Object association module 62 associates detected objects in a current frame of a passive image with corresponding detected objects in a previous frame of a passive image. Using different frames of passive images, SLAM-DATMO module 60 can track a lateral movement (e.g., in the x and y pixel coordinate directions) and the range movement (e.g., toward or away from taxiing aircraft 12) of the detected objects. Using aircraft inputs, SLAM-DATMO module 60 can determine if the detected objects are stationary or moving. This information, in conjunction with outputs from object boundary modeler 56, can enhance ability to characterize object type. Predictor 66 can then use this information along with the past and current movements of the detected objects to predict future locations and movements of these detected objects. Predictor 66 can then output these future predictions to zone checker 58 for use in identifying a collision risk score. In some embodiments, predictor 66 can predict a time to impact of the aircraft and the detected objects.

Figure 4:
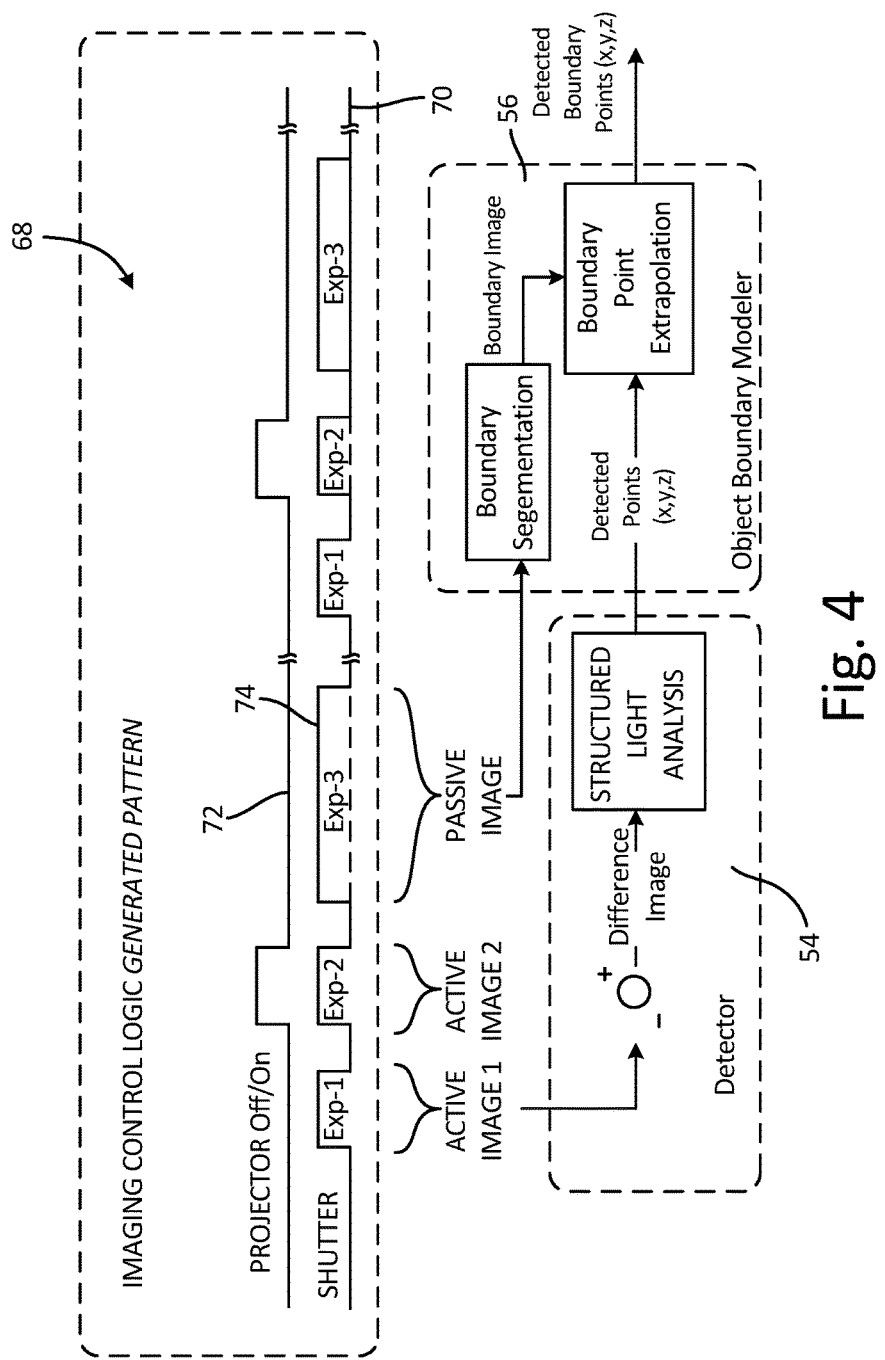
FIG. 4 is a timing diagram depicting the timing of various operations of the exemplary aircraft collision alerting system depicted in FIGS. 2-3.

FIG. 4 is a timing diagram depicting the timing of various operations of the exemplary aircraft collision alerting system depicted in FIGS. 2-3. In FIG. 4, timing diagram 68 has horizontal axis 70. Horizontal axis 70 corresponds to time. Timing diagram 68 includes light projector timing signal 72 and camera exposure timing signal 74. Light projector timing signal 72 controls the projection of a collimated beam of light by infrared light projector(s) 34. Camera exposure timing signal 74 controls the timing of image generation by camera(s) 36. Each of the control signals 72, 74 are depicted for two periodic cycles in timing diagram 68. Each periodic cycle of timing diagram 68 depicts camera exposure timing signal indicating that camera(s) 36 is commanded to obtain three different images per periodic cycle. Camera(s) 36 is commanded to generate a first image during a time span in which projector timing signal 72 commands infrared light projector(s) 34 to be in an off state. Camera(s) 36 is commanded to generate a second image during a time span in which projector timing signal 72 commands infrared light projector(s) 34 to project a collimated beam of light upon the scene. Camera(s) 36 is commanded to generate a third image during a time span in which projector timing signal 72 commands infrared light projector(s) 34 again to be in an off state. Exposure timing of the third image may be increased to improve the quality of the third image, for example.

FIG. 4 also depicts detector 54 receiving the first and second images generated by camera(s) 36. Detector 54 generates a difference image by subtracting the first image from the second image. Detector 54 then performs structured light analysis on the difference image so generated. The differencing technique can also be used to improve performance in raining and possibly snowing conditions by subtracting out the droplets. The structured light analysis can include determining range values for each pixel of the difference image that has an intensity value greater than a predetermined threshold. For example, for every pixel that has an intensity value that is greater than zero, a range value might be assigned.

The results of the structured light analysis are then transmitted to object boundary modeler 56. Object boundary modeler 56 also receives the third image generated by camera(s) 36. Object boundary modeler 56 performs boundary segmentation on the third image to find pixel boundaries for objects in the third image. For example, edge detection, and/or texture analysis can be used to identify different objects in the third image. Object boundary modeler 56 then uses the received results of the structured light analysis and the results of the boundary segmentation to perform boundary point extrapolation. Boundary point extrapolation can involve identifying the pixels used to calculate range values by the structured light analysis that reside within the pixel boundaries of the objects found by object boundary modeler 56. Boundary point extrapolation further can include determining range values for the pixels not used in the structured light analysis that also reside within the objects found by object boundary modeler 56. Ranges for these pixels can be determined based on the range values for nearby pixels that have already been determined by detector 54. The results of boundary point extrapolation can then be output to zone checker 58 (depicted in FIG. 3).

Figure 5:
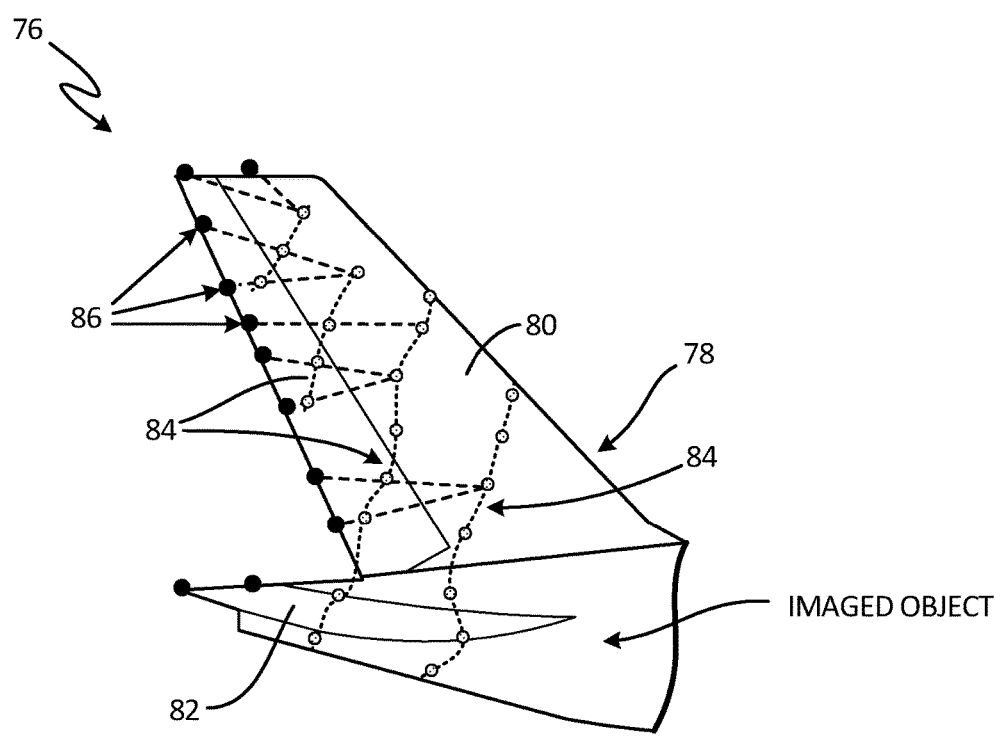
FIG. 5 is a schematic diagram depicting object location determination using both active and passive imaging.

FIG. 5 is a schematic diagram depicting object location determination using both active and passive imaging. In FIG. 5, camera image 76 of tail 78 of aircraft 14 external to taxiing aircraft 12 (depicted in FIG. 1) is shown. Camera image 76 is composed from intensity data of a two-dimensional array of light-sensitive pixels (not individually depicted). Tail 78 includes vertical stabilizer 80 and horizontal stabilizer 82. Vertical stabilizer 80 depicts features 84 of a collimated beam of light projected thereon. Features 84 are diagonal lines of light. Features 84 are imaged by a subset of the two-dimensional array of light-sensitive pixels composing the image. For each of the subset of the two-dimensional array of light-sensitive pixels containing the collimated beam of light projected upon tail 78, a range value is calculated.

Between the subset of pixels that have calculated range values, are pixels upon which the collimated beam of light has not been projected. For some, if not all, of these pixels, range values can be calculated using the already calculated range values corresponding to nearby pixels. For example, range values can be calculated for the pixels determined to be boundary pixels of an object. Range values for boundary pixels 86 may be calculated by modeling the range variations within a single object as a polynomial function of spatial coordinates, for example. Such a model may be used to calculate range values using the pixel coordinates and corresponding range values of pixels having already calculated range values that reside within the object boundary associated with boundary pixels 86.

Various embodiments can use various collimated beam of lights having various features. For example, in some embodiments, vertical or diagonal lines can be projected upon a scene. In some embodiments, spots of light can be projected upon a scene. In an exemplary embodiment, both vertical lines and horizontal lines can be projected upon a scene, using projectors that are horizontally and/or vertically displaced, respectively, from the camera location.

Apparatus and associated methods relate to calculating position and/or range data of object(s) in a scene external to an aircraft. A light projector is configured to project, from an aircraft projector location, a collimated beam of light in a controllable direction onto the scene. The light projector is further configured to control the intensity of the projected light, based on the controlled direction of the collimated beam of light. The reflected beam is detected by a camera located apart from the light projector. An image processor is configured to use triangulation, to calculate position values and/or range data of the object(s) in the scene. The image processor can be further configured to identify the object(s)

in the scene and to produce, based in object(s) in the scene, one or more maps of the scene. The intensity of the collimated beam can be controlled based on the produced maps.

Figure 6:
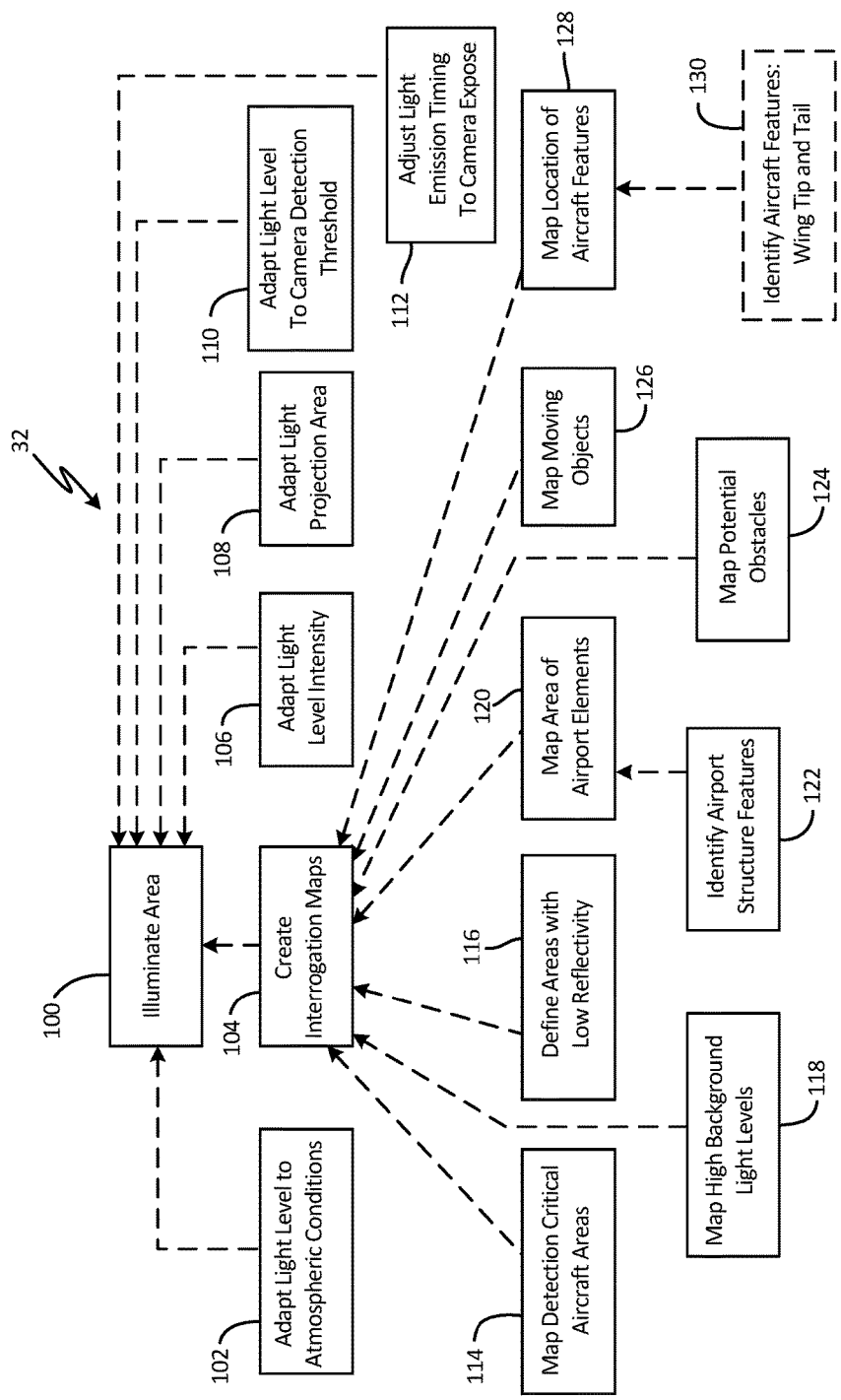
FIG. 6 is a schematic diagram depicting various projector maps that can be created and used to control and/or coordinate beam direction, beam intensity and timings of beam emission and camera imaging.

FIG. 6 is a schematic diagram depicting various projector maps that can be created and used to control and/or coordinate beam direction, beam intensity and timings of beam emission and camera imaging. The various maps depicted in FIG. 6 can be used by digital processor 44 (depicted in FIG. 2) to define specific areas or regions within the captured images. Light projector 34 can then be controlled, based on the various maps to adjust direction of illumination, rise time to peak intensity, duration of illumination and/or peak intensity of the collimated beam, and to coordinate timing of emission and image capture. Some of the depicted maps, for example, define areas where objects, if positioned therein, present a dangerous hazard of collision. For example, areas forward of the wingtips and engines can be identified in such maps. Some of the maps may include areas or regions that are difficult for the light source to illuminate for various reasons. For example, the reflectivity of the objects reflecting the collimated beam can be calculated and such data can be put into a map. Some areas or regions will have higher or lower solar illumination levels due to shadows and/or reflections. Maps can be created to log such data so that adequate illumination levels are used for every region in the captured images.

Large areas or regions of the captured images that receive the collimated beam reflected by a large continuous surface may not need to be probed extensively and may still yield accurate location and/or range computations. Thus, power can be conserved in such scenarios by directing the collimated beam toward such large continuous surfaces with few pulses or over a relatively small area with respect to the object(s) extent. Maps can be maintained for each such continuous surface. If an object is detected that is within the path of the taxiing aircraft or is likely to traverse the path in the near future, such objects may be probed by the collimated beam with high frequency. Maps can be maintained for such objects so as to catalog such potential hazards. Such detected objects can be grouped together if they are determined to be parts of a common entity. Digital processor 44 can then identify sub-regions in the group of regions that can be probed by the collimated beam. In some embodiments such sub-regions can be selected based on the reflectivity of the common entity corresponding to those sub-regions. Identification of specific regions to probe with the collimated beam can reduce the number of pulses of the collimated beam necessary to calculate location and/or range data corresponding to the common entity.

In FIG. 6, projector maps generator 59 is depicted in modular form. Projector maps 59 includes illumination controller 100, atmospheric conditions module 102, interrogation map module 104, collimated beam intensity module 106, collimated beam direction module 108, camera sensitivity module 110, and camera timing module 112. Illumination controller 100 receives inputs from each of modules 102, 104, 106, 108, 110 and 112. Illumination controller 100 controls all illumination parameters based on the inputs received from modules 102, 104, 106, 108, 110 and 112.

Interrogation map module 104 manages various maps and generates a map that assigns a criticality level to various image regions based on the various maps received from other modules. Critical aircraft area module 114 provides maps of regions that are assigned criticality levels. High criticality levels are assigned to regions that are in the path of aircraft structures such as wing tips, nacelles, and landing gear. Reflectivity module 116 provides maps of the reflectivity of objects reflecting the collimated beam. Background light module 118 provides maps that correspond to a background light level of the various regions imaged by the camera(s) 36. Airport elements module 120 provide maps identifying various permanent and/or semi-permanent structures of various airports. Airport structure features module 122 provides maps of specific features, such as projecting features, of the various permanent and/or semi-permanent structures. Potential obstacle module 124 provides maps that indicate image regions that correspond to objects that could potentially collide with the aircraft. Moving objects module 126 provides maps that indicate image regions from which the collimated beam is reflected from a moving object. Such objects can require tracking and predicting the path of movement, so as to predict if such objects present a collision hazard. Aircraft feature module 128 provides maps of various aircraft features. Collision prone features module 130 provides maps identifying specific aircraft features that are prone to collision, such as wing tips and tail, etc.

Figure 7A:
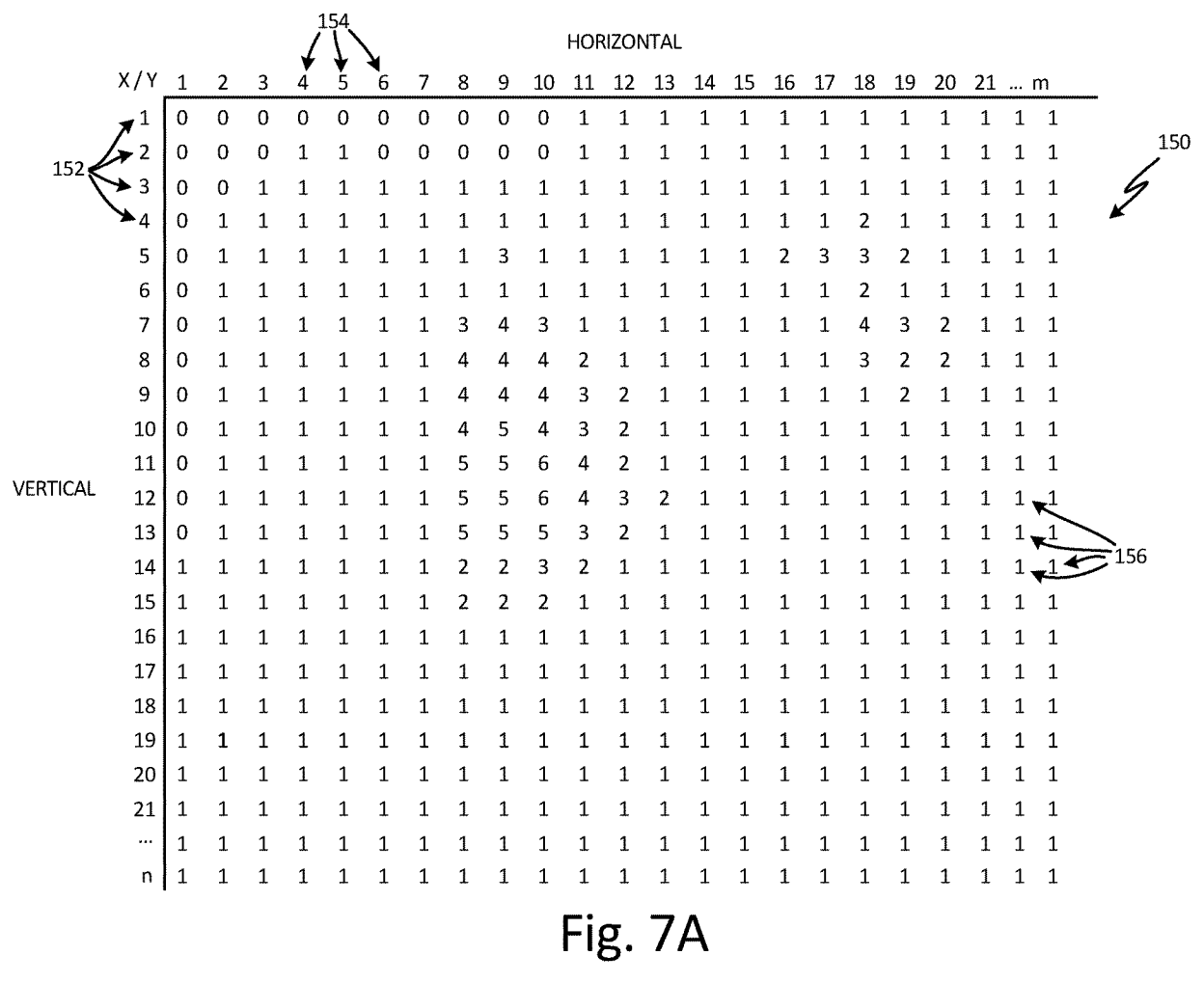

FIG. 7A is a diagram depicting a portion of a data map of projector light intensity of illumination duration. Data map 150 has horizontal rows 152, each corresponding to a vertical direction in a projection field of view, and vertical columns 154, each corresponding to a horizontal direction in the projection field of view. Data map 150 includes an array of light intensity values 156 at the intersections of horizontal rows 152 and vertical columns 154. Data map 150 can be used by light projector 34 (depicted in FIGS. 2-3) to control an intensity of a projected collimated beam of light. The projected collimated beam of light can be controlled to an intensity/duration level corresponding to intensity value 156 of data map 150.

The collimated beam may be directionally scanned, for example, beginning at x/y location 1/1 through x/y location 1/m. Such a directional scan corresponds to the top horizontal row 152. Then, the collimated beam may be directionally scanned beginning at x/y location 2/1 through x/y location 2/m. In this fashion, the collimated beam may then be sequentially scanned through the rest of the horizontal rows corresponding with x locations 3 through n. As the collimated beam is being directionally scanned, light projector 34 can control the intensity/duration of the beam so that the intensity/duration at each x/y location corresponds to intensity value 156 at each x/y location. The map size corresponds to a portion of the field of view and the desired resolution of the projector output.

Figure 7B:
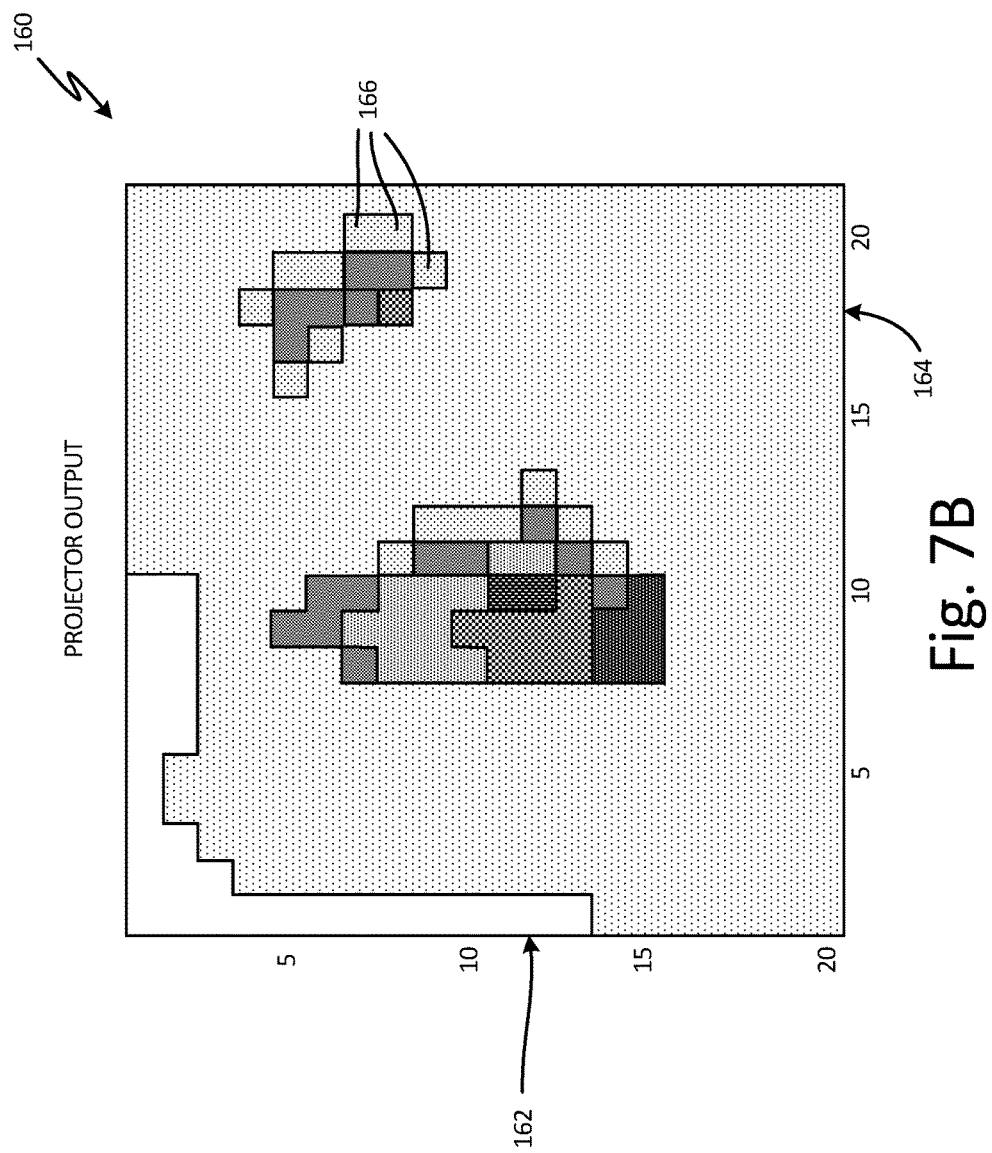
FIG. 7B is a depiction of light output from a projector showing spatial pattern of average light intensity corresponding to the map depicted in FIG. 7A.

FIG. 7B is a depiction of light output from a projector showing spatial pattern of average light intensity corresponding to the map depicted in FIG. 7A. Light output image 160 includes vertical axis 162 and horizontal axis 164. Vertical axis 162 has y coordinates that correspond to the y locations depicted in FIG. 7A. Horizontal axis 164 has x coordinates that correspond to the x locations depicted in FIG. 7A. Light output image 160 is a negative image, in which the highest intensities are depicted as the darkest regions, and the lowest intensities are depicted as the lightest regions.

By maintaining the various maps identified above, optimal control of beam direction and illumination power and be provided. Optimal coordination of timing of beam projection and image capture can also be provided using such maps. Such optimal control and coordination can permit low-power operation of aircraft collision alerting system 32. Using such maps can also improve the reliably of aircraft collision alerting system 32, by maintaining catalogues of mobile and immobile objects external to the aircraft.

The following are non-exclusive descriptions of possible embodiments of the present invention.

Apparatus and associated method relate to a system for calculating position values and/or range data of object(s) in a scene external to an aircraft. The system includes a light projector mounted at a projector location on the aircraft and configured to project a collimated beam of light in a controllable direction onto the scene external to the aircraft. The light projector is further configured to control an intensity of the projected collimated beam of light, based on the controllable direction of the collimated beam of light. The system includes a camera mounted at a camera location on the aircraft and configured to receive a portion of the collimated beam reflected by the scene. The camera is further configured to focus the received portion onto a focal plane array comprising a plurality of light-sensitive pixels, thereby forming an image of the scene, the image comprising pixel data generated by the plurality of light-sensitive pixels. The system also includes an image processor configured to identify pixel coordinates corresponding to a subset of the plurality of light-sensitive pixels upon which the received portion of the collimated beam reflected by the scene is focused. The image processor is further configured to use triangulation, based on the projector location, the camera location, and the identified pixel coordinates, to calculate the position values and/or range data of object(s) in the scene by which the collimated beam of light is reflected.

A further embodiment of the foregoing system, wherein the image processor can be further configured to identify, based on the image formed by the camera, the object(s) in the scene.

A further embodiment of any of the foregoing systems, wherein the image processor can be further configured to correlate the object(s) identified in the image of the scene with the controllable direction of the collimated beam of light.

A further embodiment of any of the foregoing systems, wherein the light projector can be further configured to control the intensity of the projected light, based on the identified object(s) correlated to the controllable direction of the collimated beam of light.

A further embodiment of any of the foregoing systems, wherein the image processor can be further configured to produce, based in the identified object(s) in the scene, one or more maps of the scene.

A further embodiment of any of the foregoing systems, wherein the one or more maps of the scene can include a map of object(s) moving with respect to a ground reference.

A further embodiment of any of the foregoing systems, wherein the one or more maps of the scene can include a map of object(s) not moving with respect to a ground reference.

A further embodiment of any of the foregoing systems, wherein the one or more maps of the scene can include a map of object(s) not moving with respect to an aircraft reference.

A further embodiment of any of the foregoing systems, wherein the one or more maps of the scene can include a map of an intensity ratio of an intensity of the received portion to the controlled intensity of the projected collimated beam.

A further embodiment of any of the foregoing systems, wherein the one or more maps of the scene can include a map of reflectivity of object(s) in the scene.

A further embodiment of any of the foregoing systems, wherein the light projector can control, based on the map of reflectivity, the intensity of the projected beam of collimated light such that the intensity of the beam of collimated light is higher when the beam is directed toward low-reflectivity object(s) than when directed toward high-reflectivity object(s).

A further embodiment of any of the foregoing systems, wherein the collimated beam of light projected by the light projector can include infrared light and the camera can be an infrared camera and the light-sensitive pixels are sensitive to infrared light.

A further embodiment of any of the foregoing systems, wherein the collimated beam of light projected by the light projector can include infrared light having a wavelength corresponding to a lower solar intensity portion or to an atmospheric absorption band.

A further embodiment of any of the foregoing systems, wherein the image processor can be further configured to generate an alert signal if the calculated position values and range data of object(s) indicate that object(s) are within a collision zone or on a collision trajectory.

A further embodiment of any of the foregoing systems can further include an audible alarm that is activated when the calculated position values and range data indicate one or more of the object(s) in the scene has a combination of an object range and an object direction relative to the aircraft corresponding to a risk of collision above a predetermined threshold.

A further embodiment of any of the foregoing systems, wherein the cockpit notification system can include a display device configured to display the image of the scene annotated with the calculated position and/or range data.

Some embodiments relate to a method for generating an alert signal of a potential aircraft collision for a taxiing aircraft. The method includes projecting a beam of collimated light in a controllable direction onto a scene. The method includes controlling an intensity of the projected beam of collimated light, based on the controlled direction of the projected beam of collimated light. The method includes receiving a portion of the beam of collimated light reflected by the scene. The method includes focusing the received portion of the beam of collimated light onto a focal plane array comprising a plurality of light-sensitive pixels, thereby forming an image of the scene. The image includes pixel data generated by the plurality of light-sensitive pixels. The method includes identifying pixel coordinates corresponding to a subset of the plurality of light-sensitive pixels upon which the received portion of the collimated beam reflected by the scene is focused. The method includes calculating, based on a projector location, a camera location, and the identified pixel coordinates, position values and/or range data of object(s) in the scene by which the collimated beam of light is reflected. The method also includes generating an alert signal if the calculated position values and range data of the object(s) indicate that one or more of the object(s) are within a collision zone or on a collision trajectory.

A further embodiment of the foregoing method can further include correlating the object(s) identified in the image of the scene with the controllable direction of the collimated beam of light.

A further embodiment of any of the foregoing methods can further include controlling the intensity of the projected light, based on identified object(s) correlated to the controllable direction of the collimated beam of light.

A further embodiment of any of the foregoing methods can further include producing, based on the identified object(s) in the scene, one or more maps of the scene.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for calculating position values and/or range data of object(s) in a scene external to an aircraft, the system comprising:
   a light projector mounted at a projector location on the aircraft and configured to project a collimated beam of light in a controllable direction onto the scene external to the aircraft, the light projector further configured to control an intensity of the projected collimated beam of light, based on the controllable direction of the collimated beam of light;
   a camera mounted at a camera location on the aircraft and configured to receive a portion of the collimated beam reflected by the scene, and further configured to focus the received portion onto a focal plane array comprising a plurality of light-sensitive pixels, thereby forming an image of the scene, the image comprising pixel data generated by the plurality of light-sensitive pixels; and
   an image processor configured to identify pixel coordinates corresponding to a subset of the plurality of light-sensitive pixels upon which the received portion of the collimated beam reflected by the scene is focused, the image processor further configured to use triangulation, based on the projector location, the camera location, and the identified pixel coordinates, to calculate the position values and/or range data of object(s) in the scene by which the collimated beam of light is reflected.

2. The system of claim 1, wherein the image processor is further configured to classify, based on the image formed by the camera, the object(s) in the scene.

3. The system of claim 2, wherein the image processor is further configured to correlate the object(s) identified in the image of the scene with the controllable direction of the collimated beam of light.

4. The system of claim 3, wherein the light projector is further configured to control the intensity of the projected light, based on the identified object(s) correlated to the controllable direction of the collimated beam of light.

5. The system of claim 2, wherein the image processor is further configured to produce, based in the identified object(s) in the scene, one or more maps of the scene.

6. The system of claim 5, wherein the one or more maps of the scene includes a map of object(s) moving with respect to a ground reference.

7. The system of claim 5, wherein the one or more maps of the scene includes a map of object(s) not moving with respect to a ground reference.

8. The system of claim 5, wherein the one or more maps of the scene includes a map of object(s) not moving with respect to an aircraft reference.

9. The system of claim 5, wherein the one or more maps of the scene includes a map of an intensity ratio of an intensity of the received portion to the controlled intensity of the projected collimated beam.

10. The system of claim 5, wherein the one or more maps of the scene includes a map of reflectivity of object(s) in the scene.

11. The system of claim 10, wherein the light projector controls, based on the map of reflectivity, the intensity of the projected beam of collimated light such that the intensity of the beam of collimated light is higher when the beam is directed toward low-reflectivity object(s) than when directed toward high-reflectivity object(s).

12. The system of claim 1, wherein the collimated beam of light projected by the light projector comprises infrared light and the camera is an infrared camera and the light-sensitive pixels are sensitive to infrared light.

13. The system of claim 12, wherein the collimated beam of light projected by the light projector comprises infrared light having a wavelength corresponding to a lower solar intensity portion or to an atmospheric absorption band.

14. The system of claim 1, wherein the image processor is further configured to generate an alert signal if the calculated position values and range data of object(s) indicate that object(s) are within a collision zone or on a collision trajectory.

15. The system of claim 1, wherein the system further comprises:
   an audible alarm that is activated when the calculated position values and range data indicate one or more of the object(s) in the scene has a combination of an object range and an object direction relative to the aircraft corresponding to a risk of collision above a predetermined threshold.

16. The system of claim 14, wherein the cockpit notification system includes a display device configured to display the image of the scene annotated with the calculated position and/or range data.

17. A method for generating an alert signal of a potential aircraft collision for a taxiing aircraft, the method comprising the steps of:
   projecting a beam of collimated light in a controllable direction onto a scene;
   controlling an intensity of the projected beam of collimated light, based on the controlled direction of the projected beam of collimated light;
   receiving a portion of the beam of collimated light reflected by the scene;
   focusing the received portion of the beam of collimated light onto a focal plane array comprising a plurality of light-sensitive pixels, thereby forming an image of the scene, the image comprising pixel data generated by the plurality of light-sensitive pixels;
   identifying pixel coordinates corresponding to a subset of the plurality of light-sensitive pixels upon which the received portion of the collimated beam reflected by the scene is focused;
   calculating, based on a projector location, a camera location, and the identified pixel coordinates, position values and/or range data of object(s) in the scene by which the collimated beam of light is reflected; and
   generating an alert signal if the calculated position values and range data of the object(s) indicate that one or more of the object(s) are within a collision zone or on a collision trajectory.

18. The method for generating an alert signal of a potential aircraft collision of claim 17, further comprising:
   correlating the object(s) identified in the image of the scene with the controllable direction of the collimated beam of light.

19. The method for generating an alert signal of a potential aircraft collision of claim 18, further comprising:
controlling the intensity of the projected light, based on identified object(s) correlated to the controllable direction of the collimated beam of light.

20. The method for generating an alert signal of a potential aircraft collision of claim 17, further comprising:
producing, based on the identified object(s) in the scene, one or more maps of the scene.

\* \* \* \* \*